(12) United States Patent
Shishitani et al.

(10) Patent No.: US 7,678,489 B2
(45) Date of Patent: Mar. 16, 2010

(54) PROCESS FOR PRODUCING A FUEL CELL SEPARATOR

(75) Inventors: Hideyuki Shishitani, Hamamatsu (JP); Atsushi Murakami, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 1106 days.

(21) Appl. No.: 11/243,182

(22) Filed: Oct. 5, 2005

(65) Prior Publication Data
US 2006/0121329 A1 Jun. 8, 2006

(30) Foreign Application Priority Data
Oct. 7, 2004 (JP) .................. P. 2004-294912

(51) Int. Cl.
H01M 2/08 (2006.01)

(52) U.S. Cl. .............. 429/36; 429/39; 429/34; 429/253; 429/249; 429/247; 264/105; 264/232; 264/330; 252/511

(58) Field of Classification Search .......... 429/39, 429/34, 36, 247, 249, 253; 264/105, 232, 264/330; 252/511
See application file for complete search history.

(56) References Cited

U.S. PATENT DOCUMENTS 6,998,189 B2 * 2/2006 Saito et al. ............ 429/39
2002/0034672 A1 3/2002 Saito et al.
2003/0087143 A1 * 5/2003 Nakanishi et al. .......... 429/36
2004/0247978 A1 12/2004 Shimamune
2005/0008919 A1 1/2005 Extrand
2005/0014053 A1 1/2005 Ohtani et al.
2005/0048347 A1 3/2005 Takashita et al.

FOREIGN PATENT DOCUMENTS

| EP | 0 949 704 A1 | 10/1999 |
|----|--------------|---------|
| EP | 1 223 630 A2 | 7/2002 |
| EP | 1 542 300 A2 | 6/2005 |
| JP | 2000-082475 | 3/2000 |
| JP | 2000-82475 | 3/2000 |
| JP | 2000-106198 | 4/2000 |
| JP | 2000-243410 | 9/2000 |
| JP | 2000-251903 | 9/2000 |
| JP | 2000-311695 | 11/2000 |
| JP | 2001-38626 | 2/2001 |
| JP | 2002-352813 | 12/2002 |
| JP | 2003-200225 | 7/2003 |
| JP | 2004-139885 | 5/2004 |
| WO | WO 03/026052 A1 | 3/2003 |

* cited by examiner

Primary Examiner—Laura S Weiner
(74) Attorney, Agent, or Firm—Nixon & Vanderhye P.C.

(57) ABSTRACT

The present invention provides a separator for fuel cell, which is a molded article including a resin and a conductive filler, wherein a contact angle of water on a surface of the separator for fuel cell is from 20 to 85°, and a process for producing the separator for fuel cell.

7 Claims, 1 Drawing Sheet

PROCESS FOR PRODUCING A FUEL CELL SEPARATOR

FIELD OF THE INVENTION

The present invention relates to a separator for a fuel cell and a process for producing the separator for fuel cell.

BACKGROUND OF THE INVENTION

A stable supply of gases (e.g., oxygen gas or hydrogen gas) and a function of discharging water generated by a reaction between the gases are important characteristics of a separator for fuel cell. Particularly, rapid discharge of the generated water has much effect on characteristics of a fuel cell. One of important requirements for the smooth discharge of generated water is a hydrophilic property (wettability) of a surface of a rib of the separator for fuel cell.

A molded article containing a resin and a conductive filler is widely used for the separator for fuel cell, and the separator for fuel cell made from such a electroconductive resin readily repels water due to its high water repelling property. Water droplets deposited on a channel cause a reduction in circulation efficiency of the generated water to degrade the cell characteristics.

In order to improve the circulation of the generated water, various treatment for increasing hydrophilic property have heretofore been proposed. For example, a method of activating a surface by ozone treatment through UV irradiation has been known (see Reference 1). However, it is necessary to perform the UV irradiation for a considerable period of time in order to realize a sufficient hydrophilic property by the method, and the hydrophilic property achieved by the method changes largely with time to result in insufficient durability. Also, a method of forming a cured film by coating with a hydrophilic monomer has been known (Reference 2). However, flow of the cured film can cause a reduction in hydrophilic property, and an insulation property of the cured film can cause a reduction in electroconductivity. Further, a method of blending a hydrophilic resin such as a phenol resin and an epoxy resin as a binder has been known (Reference 3). However, hydrophilic property on a surface achieved by this method is insufficient. Furthermore, a blending of polymethacrylate as a hydrophilic agent has been proposed (Reference 4), but this method can cause a reduction in hot strength, an increase in creep, and a reduction in water resistance of the obtained separator for fuel cell.

Reference 1: JP 2000-243410 A
Reference 2: JP 2000-251903 A
Reference 3: JP 2000-311695 A
Reference 4: JP 2002-352813 A

SUMMARY OF THE INVENTION

This invention has been accomplished in view of the above-described circumstances, and an object thereof is to impart a good hydrophilic property to a separator for fuel cell without influencing on electroconductivity and machine characteristic of the separator for fuel cell.

Other objects and effects of the invention will become apparent from the following description.

The present inventors have made eager investigation to examine the problem. As a result, it has been found that the foregoing objects can be achieved by the following separator for fuel sell and process for producing the separator for fuel cell. With this finding, the present invention is accomplished.

The present invention is mainly directed to the following items:

(1) A separator for fuel cell, which is a molded article comprising a resin and a conductive filler, wherein a contact angle of water on a surface of the separator for fuel cell is from 20 to 85°.

(2) The separator for fuel cell according to item (1), wherein a contact angle of water on a surface of the separator for fuel cell is from 30 to 70°.

(3) The separator for fuel cell according to item (1), wherein a contact angle of water on a surface of the separator for fuel cell is from 40 to 60°.

(4) The separator for fuel cell according to item (1), wherein a surface of the separator for fuel cell is subjected to a blast treatment.

(5) The separator for fuel cell according to item (1), wherein the resin is a thermosetting resin.

(6) The separator for fuel cell according to item (1), wherein the conductive filler comprises at least an expanded graphite.

(7) The separator for fuel cell according to item (6), wherein the separator for fuel cell contains the expanded graphite in an amount of from 20 to 60% by weight.

(8) A process for producing a separator for fuel cell, which comprises: mixing a resin with a conductive filler to obtain a mixture; molding the mixture to obtain a molded article; and subjecting to a blast treatment on a surface of the molded article.

(9) The process for producing a separator for fuel cell according to item (8), wherein the blast treatment is a dry blast treatment.

(10) The process for producing a separator for fuel cell according to item (8), wherein the blast treatment is carried out by using particles having a diameter of from 5 to 1,000 µm.

(11) The process for producing a separator for fuel cell according to item (9), wherein the blast treatment is carried out by using at least one particles selected from metal particles, ceramic particles, glass beads, resin particles and plant particle.

(12) The process for producing a separator for fuel cell according to item (8), wherein the resin is a thermosetting resin.

(13) The process for producing a separator for fuel cell according to item (8), wherein the conductive filler comprises at least an expanded graphite.

(14) The process for producing a separator for fuel cell according to item (13), wherein the content of the expanded graphite is from 20 to 60% by weight of the separator for fuel cell.

According to this invention, it is possible to impart a good hydrophilic property to a separator for fuel cell without influencing on electroconductivity and machine characteristic of the separator for fuel cell. Moreover, since it is possible to achieve the hydrophilic property only by subjecting to a blast treatment, the method is applicable to existing separators for fuel cell and is high in general versatility, and the method is easily practiced.

DETAILED DESCRIPTION OF THE INVENTION

Figure 1A:
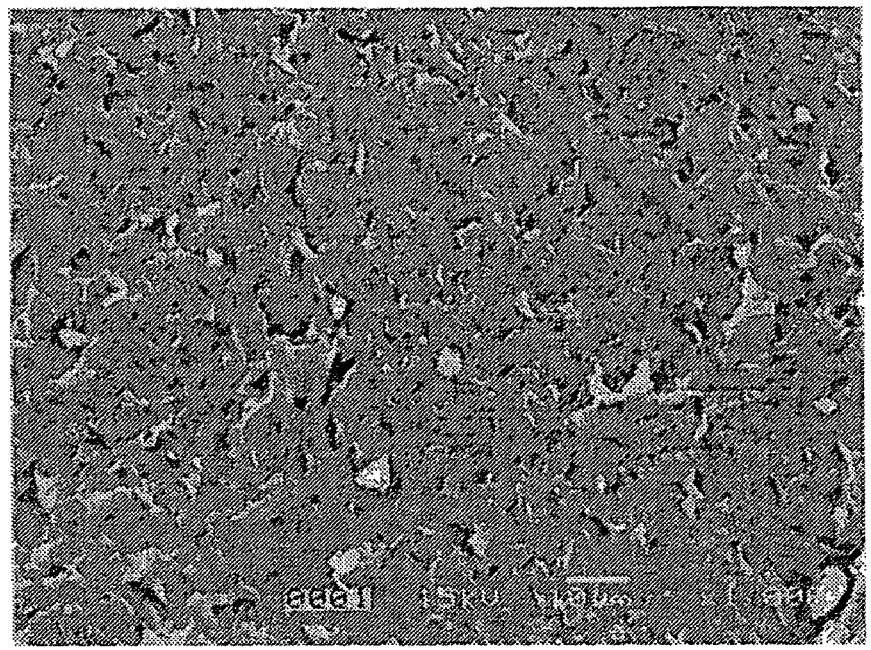
FIG. 1A is a SEM picture of a surface of a fuel cell of Example 1.

Hereinafter, this invention will be described in detail.

A separator for fuel cell according to this invention is a molded article containing a resin and a conductive filler, and a surface of the separator for fuel cell has a hydrophilic property of a contact angle of water of 20 to 85° (JIS R3257).

In this invention, the resin is preferably a thermosetting resin. The conductive filler preferably comprises at least an expanded graphite. Furthermore, the separator for fuel cell of this invention is preferably a electroconductive resin composition containing a thermosetting resin and an expanded graphite as a conductive filler, in view of superior electroconductivity and machine characteristics.

Examples of the thermosetting resin include an epoxy resin, a phenol resin, a furan resin, an unsaturated polyester resin, a polyimide resin, and the thermosetting resins can be used either individually or as a combination of two or more thereof. It is preferable to use the epoxy resin, in view of obtainable characteristics, productivity.

As used herein, the epoxy resin means structures obtained by a reaction between a polyfunctional epoxy compound and a curing agent as well as epoxy compounds and curing agents giving the structures. Hereinafter, the epoxy compound before reaction is referred to as epoxy resin precursor. Further, an amount of the epoxy resin is equal to a mass of an epoxy hardened material.

As the epoxy resin precursor, it is possible to use various compounds. Examples of the epoxy resin precursor include: a difunctional epoxy compound such as a bisphenol A diglycidyl ether type, a bisphenol F diglycidyl ether type, a bisphenol S diglycidyl ether type, a bisphenol AD diglycidyl ether type, and a resorcinol diglycidyl ether type; a polyfunctional epoxy compound such as a phenol novolac type and a cresol novolac type; a linear aliphatic epoxy compound such as an epoxidized soybean oil; a cyclic aliphatic epoxy compound; a heterocyclic epoxy compound; a glycidylester based epoxy compound; and glycidylamine based epoxy compound, without limitation thereto. A compound having a substituent such as halogen and a compound having a hydrogenated aromatic ring can also be used as the epoxy resin precursor. An epoxy equivalent amount, a molecular weight, number of epoxy groups of the epoxy resin precursor are not particularly limited. However, it is possible to lengthen a usable life of the epoxy resin precursor by the use of an epoxy compound having an epoxy equivalent amount of about 400 or more, particularly 700 or more. Further, since these compounds are solid substances at an ordinary temperature, handling of the compounds are easy when used in powder molding. It is possible to use plural types of the epoxy compounds in combination. For instance, it is possible to mix: an epoxy resin precursor having an epoxy equivalent amount of about 200, which is capable of giving a hardened material having a high mesh density; with a epoxy resin precursor having an epoxy equivalent amount of about 900, which has a long usable life, to use the thus-obtained compound as a powder or a liquid substance having a relatively long usable life.

Each of the epoxy resin precursors generates an epoxy hardened material when reacted with a curing agent. Various compounds may be used as the curing agent. Examples of the curing agents include: aliphatic, alicyclic, or aromatic polyamine, such as dimethylenetriamine, triethylenetetramine, tetraethylenepentamine, menthenediamine, and isophoronediamine, and their carbonate; an acid anhydride such as phthalic anhydride, methyltetrahydrophthalic anhydride, and trimellitic anhydride; polyphenol such as phenolnovolac; polymercaptan; an anionic polymerization catalyst such as tris(dimethylaminomethyl)phenol, imidazole, and ethylmethylimidazole; a cationic polymerization catalyst such as $BF_3$ and a complex thereof; a potential curing agent capable of generating the above compounds by heat decomposition or photodecomposition, without limitation thereto. It is possible to use plural types of the curing agents as a combination of two or more thereof.

Also, polyimide is preferably used as a curing agent. As used herein, polyimide means all polymers having an imide group ($(-CO-)_2N-$) in a molecule. Examples of polyimide include: thermoplastic polyimide such as polyamideimide and polyetherimide; non-thermoplastic polyimide such as aromatic polyimides; thermosetting polyimide; bismaleimide type polyimide; nadic acid type polyimide such as allylnadiimide; and acetylene type polyimide, without limitation thereto. It is possible to use plural types of the polyimides as a combination of two or more thereof. It is particularly preferable to use thermosetting polyimide. Thermosetting polyimide has an advantage of easy processability as compared to thermoplastic polyimide and non-thermoplastic (aromatic) polyimide. A high temperature property of thermosetting polyimide is considerably good among organic polymers though it is inferior to that of non-thermoplastic polyimide. Also, the thermosetting polyimide is advantageous since it seldom or never causes a void and a crack.

The thermosetting resin is preferably used in an amount of from 20 to 40% by weight of a total amount of the separator for fuel cell, more preferably from 20 to 30% by weight. When the usage amount of the thermosetting resin is less than 20% by weight, it is difficult to perform molding due to a reduction in material fluidity, and an effect as a binder is reduced, a thickness recovery value of the separator for fuel cell is increased, resulting in failure in achieving a desired thickness. When the usage amount of the thermosetting resin exceeds 40% by weight, problems such as an amount of burr in molding and sticking to a die are caused due to insufficient strength, a reduction in electroconductivity, and an increase in fluidity.

In the present invention, it is preferable that the conductive filler comprises at least an expanded graphite.

The expanded graphite is a graphite which is obtained, e.g., by treating flake graphite with concentrated sulfuric acid, and heating the treated graphite to enlarge the interplanar spacing in the crystal structure of graphite, and is hughly bulky. The expanded graphite to be used has a bulk specific gravity of preferably about 0.1 $g/cm^3$ or lower, more preferably about 0.05 $g/cm^3$ or lower, further more preferably about 0.005 $g/cm^3$ or lower. Use of expanded graphite having such a bulk specific gravity gives a separator satisfactory especially in strength, electrical conductivity, and lubricity. The expanded graphite is preferably used in an amount of from 20 to 60% by weight of the separator for fuel cell. Sufficient electroconductivity is not achieved when the usage amount is less than 20% by weight, while problems in strength or molding process are raised when the usage amount exceeds 60% by weight. An artificial graphite or carbon black can be used as the conductive filler in combination with the expanded graphite.

The separator for fuel cell can contain a carbon fiber for reinforcement. Examples of the carbon fiver include a PAN carbon fiber, a pitch carbon fiber, a rayon carbon fiber. The carbon fibers can be used either individually or as a combination of two or more thereof.

A form of the carbon fiber is not particularly limited, but the carbon fiber preferably has a fiber length of from about 0.01 to 100 mm, particularly from 0.1 to 20 mm. When the fiber length exceeds 100 mm, it is difficult to perform molding and to smoothen the surface. When the fiber length is below 0.01 mm, the reinforcing effect is not expected. The carbon fiber is preferably used in an amount of from 5 to 10% by weight of the separator for fuel cell. When the usage amount is less than 5% by weight, sufficient impact resistance is not achieved. When the usage amount exceeds 10% by weight, problems in molding process occur.

In the present invention, a blast treatment is performed in order to impart a hydrophilic property to the separator for fuel cell. It is known from the Wenzel's formula indicated below that a hydrophilic surface is increased in hydrophilic property by roughening the surface, whereas a hydrophobic surface is increased in hydrophobic property thereby.

$$r \times \cos \theta = \cos \theta'$$

(wherein, r is an apparent surface area/true surface area, $\theta$ is a true contact angle of water, $\theta'$ is an apparent contact angle of water)

According to the literature ("Surface Tension"; published by Kyoritsu Shuppan Co., Ltd.; Column of Ion Exchanged Water), graphite has a contact angle of water of 86° and is hydrophilic. Therefore, it is possible to reduce a contact angle of water of the separator for fuel cell containing graphite as its main ingredient by surface roughening through the blast treatment. The separator for fuel cell containing a expanded graphite as the conductive filler is suitable for hydrophilic property since the expanded graphite is flexible, and the expanded graphite present on the surface of the separator is easily deformed by a collision of blast particles to promote the surface roughening, so that a prominent effect of achieving the hydrophilic property is realized.

In the present invention, particles of metal such as iron and carbon steel; particles of ceramic such as silicon carbide and alumina; glass beads; particles of resin such as acryl; and particles of plant such as walnut and corn husk can be used for the blast treatment. A primary particle diameter of the particles is preferably from 5 to 1000 μm (which corresponds to No. 20 to No. 3,000 according to JIS R6001). When the particle diameter is above the above range, the surface of the separator for fuel cell is deformed more than necessary. When the particle diameter is below the above range, the effect of achieving hydrophilic property becomes insufficient to lengthen the treatment time. The above particles can be used either individually or as a combination of two or more thereof.

The surface of the separator for fuel cell is roughened by the blast treatment to achieve the hydrophilic property. In order to prevent the generated water from being formed into water droplets and to ensure good flowability, the surface roughening is performed so as to achieve a contact angle of water on the surface of from 20 to 85°, preferably from 30 to 70°, more preferably from 40 to 60°. Accordingly, process conditions such as the particle diameter, the type of the particle to be used, a spray pressure, a spray amount, a spray time, and a distance between a spray nozzle and the surface are properly determined in order to achieve the contact angle. Also, in order to avoid influencing on dimension accuracy of the separator for fuel cell, a reduction in thickness by the blast treatment is preferably 20 μm or less.

One example of the process conditions of the blast treatment is described below. Alumina particles, melamine particles and acryl particles having a primary particle diameter corresponding to No. 240 to No. 1500 according to JIS R6001 are used, and the treatment is performed with a spray pressure of 0.1 to 0.7 MPa, a distance between a nozzle and the surface of 50 to 300 mm, a treatment rate of from 0.1 cm$^2$/sec to 10 cm$^2$/sec which is adjusted in accordance with the size of the separator. With such treatment conditions, the contact angle of water is reduced to 20 to 85° from the original contact angle of water of 90 to 120° to achieve the hydrophilic property.

When the contact angle of water of the separator for fuel cell according to this invention is too large, the generated water in the channel is not discharged smoothly to degrade fuel cell characteristics. On the other hand, in the case of producing a separator for fuel cell having a smaller contact angle, a mechanical damage of the separator for fuel cell to be caused by the blast treatment is increased. Such mechanical damage can cause a chip or a crack of the separator for fuel cell to undesirably deteriorate the fuel cell characteristics. Therefore, a contact angle of the separator for fuel cell with water in this invention has a preferred range. When the contact angle of the separator for fuel cell is within the range indicated above, a fuel cell excellent in power generation property is obtained.

When cleaning up the roughened surface of the separator for fuel cell after the blast treatment, it is preferable to perform the cleaning by air spraying since the air spraying does not require wastewater treatment.

EXAMPLES

The present invention is now illustrated in greater detail with reference to Examples and Comparative Examples, but it should be understood that the present invention is not to be construed as being limited thereto.

As shown in Table 1, each of Non-treated Article 1; Examples 1, 2, 3, and 4; and Comparative Examples 1, 2, 3, and 4 was obtained by molding a mixture obtained by kneading 25% by weight of a epoxy resin, 65% by weight of expanded graphite (particle diameter: 100 μm), and 10% by weight of a carbon fiber by the use of a mixing machine. A contact angle of water of the separator for fuel cell immediately after the molding (i.e., Non-treated Article 1) was 99°. The contact angle of water was measured under the conditions of 25° C., a humidity of 50%, a dripping amount of 1 μL, and a time of 20 seconds or less (according to JIS R3257).

Example 1 was obtained by subjecting a blast treatment to Non-treated Article 1 by using alumina particles having a primary particle diameter of 20 μm and under the conditions of a spray pressure of 0.5 MPa, a nozzle/surface distance of 100 mm, and a treatment rate of 0.5 cm$^2$/sec. After cleaning up by the use of compressed air, a contact angle of water of Example 1 was measured under the conditions described above. The detected contact angle of water of Example 1 was 57° to confirm that a hydrophilic property of the separator for fuel cell was satisfactory. A contact angle of water of Example 2 obtained by subjecting a blast treatment to Non-treated Article 1 by using alumina particles having a diameter of 300 μm was 60°; a contact angle of water of Example 3 obtained by subjecting a blast treatment to Non-treated Article 1 by using alumina particles having a diameter of 800 μm was 68°; and a contact angle of water of Example 4 obtained by subjecting a blast treatment to Non-treated Article 1 by using melamine particles having a diameter of 150 μm was 74°.

diameter of 20 μm as in the foregoing experiment, and a contact angle of water achieved by the blast treatment was 100° to show that Comparative Example 5 is not increased much in hydrophilic property by the blast treatment.

TABLE 1

| | | Non-treated Article 1 | Ex. 1 | Ex. 2 | Ex. 3 | Ex. 4 | Comp. Ex. 1 | Comp. Ex. 2 | Comp. Ex. 3 | Comp. Ex. 4 | Non-treated Article 2 | Comp. Ex. 5 |
|---|---|---|---|---|---|---|---|---|---|---|---|---|
| Formulation | Epoxy Resin | 25 | 25 | 25 | 25 | 25 | 25 | 25 | 25 | 25 | 25 | 25 |
| | Expanded Graphite | 65 | 65 | 65 | 65 | 65 | 65 | 65 | 65 | 65 | — | — |
| | Artificial Graphite | — | — | — | — | — | — | — | — | — | 65 | 65 |
| | Carbon Fiber | 10 | 10 | 10 | 10 | 10 | 10 | 10 | 10 | 10 | 10 | 10 |
| Treatment Condition | Particles for Blast Treatment | — | Alumina | Alumina | Alumina | Melamine | Alumina | — | — | — | — | Alumina |
| | Particle Diameter-(μm) | — | 20 | 300 | 800 | 150 | 1200 | — | — | — | — | 20 |
| | UV Irradiation Time (second) | — | — | — | — | — | — | 60 | 120 | 600 | — | — |
| Contact Angle of Water | Immediately after Treatment | 99 | 57 | 60 | 68 | 74 | 88 | 93 | 84 | 38 | 102 | 100 |
| | One Month after Treatment | — | 55 | 61 | 68 | 70 | — | 95 | 94 | 87 | — | — |

Thus, a hydrophilic property of each of Examples 2 to 4 was satisfactory. In contrast, a contact angle of water of Comparative Example 1 obtained by subjecting a blast treatment to Non-treated Article 1 by using alumina particles having a diameter of 1,200 μm was 88°, thereby revealing an insufficient hydrophilic property.

A contact angle of water of each of the separator for fuel cells was measured again after a month had passed. Example 1 had a contact angle of water of 55°; Example 2 had a contact angle of water of 61°; Example 3 had a contact angle of water of 68°; and Example 4 had a contact angle of water of 70°, thereby revealing that the excellent hydrophilic property was maintained.

On the other hand, UV irradiation was performed on each of Comparative Examples 2 to 4. Contact angle of waters were measured after performing the irradiation by the use of a UV irradiation apparatus "DUV25X5A" (manufactured by Japan Storage Battery Co., Ltd.). In the irradiation, a distance between a lamp and each of the Comparative Examples was set to 30 mm. Comparative Example 2, Comparative Example 3, and Comparative Example 4 were obtained by subjecting UV irradiation to Non-treated Article 1 for 60 seconds, 120 seconds, and 600 seconds, respectively. The contact angle of waters of the Comparative Example 2, Comparative Example 3, and Comparative Example 4 were 93°, 84°, and 38°, respectively, wherein only part of Comparative Examples achieved a satisfactory hydrophilic property. However, when contact angle of waters were measured again a month later, the contact angle of waters of the Comparative Example 2, Comparative Example 3, and Comparative Example 4 were 95°, 94°, and 87°, respectively, thereby revealing poor durability of the hydrophilic property.

Figure 1B:
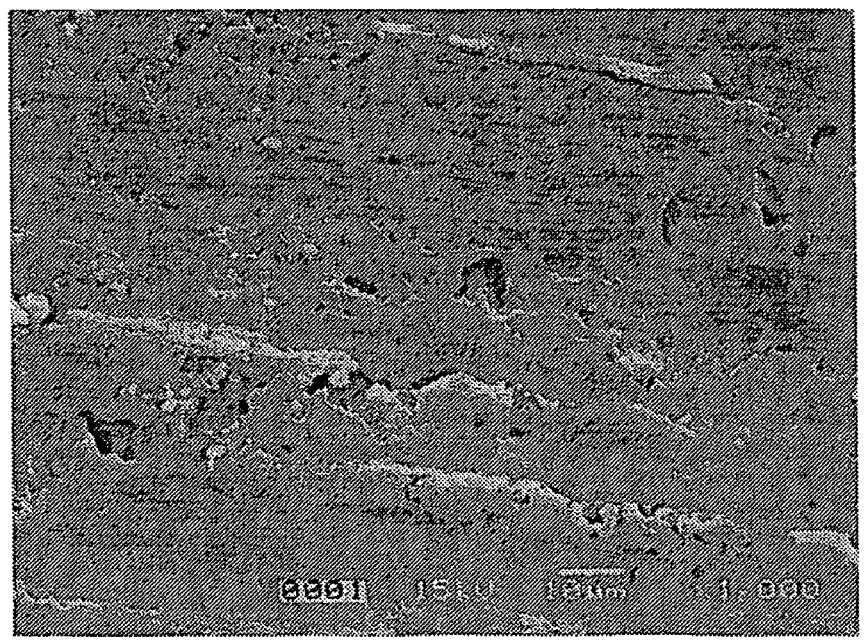
FIG. 1B is a SEM picture of a surface of a fuel cell of Non-treated Article 1.

As shown in Table 1, Non-treated Article 2 and Comparative Example 5 were produced by using an artificial graphite (particle diameter: 100 μm) in place of the expanded graphite. A contact angle of water of Non-treated Article 2 immediately after the molding was 102°. Comparative Example 5 was obtained by subjecting a blast treatment to Non-treated Article 2 by using alumina particles having a primary particle SEM pictures of surfaces of Example 1 and Non-treated Article 1 are shown in FIGS. 1A and 1B, respectively. As is apparent from the comparison between FIGS. 1A and 1B, a fine irregularity pattern is formed on the surface of Example 1 by the blast treatment.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2004-294912 filed on Oct. 7, 2004, and the contents thereof are incorporated herein by reference.

What is claimed is:

1. A process for producing a separator for a fuel cell, which comprises the steps of:
   (a) mixing a resin with a conductive filler to obtain a mixture, wherein said resin comprises a thermosetting resin including an epoxy resin, and wherein said conductive filler comprises an expanded graphite;
   (b) molding the mixture to obtain a molded article; and
   (c) subjecting a surface of the molded article to a dry blast treatment carried out by using particles having a diameter of from 5 to 1,000 μm until the contact angle of water on a surface of the separator for a fuel cell is from 20 to 85°.

2. The process of claim 1, wherein the contact angle of water on a surface of the fuel cell separator is from 30 to 70°.

3. The process of claim 1, wherein the contact angle of water on a surface of the fuel cell separator is from 40 to 60°.

4. The process of claim 1, wherein the blast treatment is carried out by using particles selected from metal particles, ceramic particles, glass beads, resin particles and plant particles.

5. The process of claim 1, wherein the content of the expanded graphite is from 20 to 60% by weight of the separator for a fuel cell.

6. The process of claim 1, wherein the amount of the thermosetting resin is from 20 to 40% by weight of the total weight of the separator for a fuel cell.

7. The process of claim 1, wherein the step of mixing further comprises adding carbon fibers having a fiber length of from 0.01 to 100 mm in an amount of from 5 to 10% by weight of the separator for a fuel cell.

* * * * *